No. 768,613. PATENTED AUG. 30, 1904.
J. MAITLAND.
STRENGTH TESTING APPARATUS.
APPLICATION FILED OCT. 9, 1903.
NO MODEL. 4 SHEETS—SHEET 1.
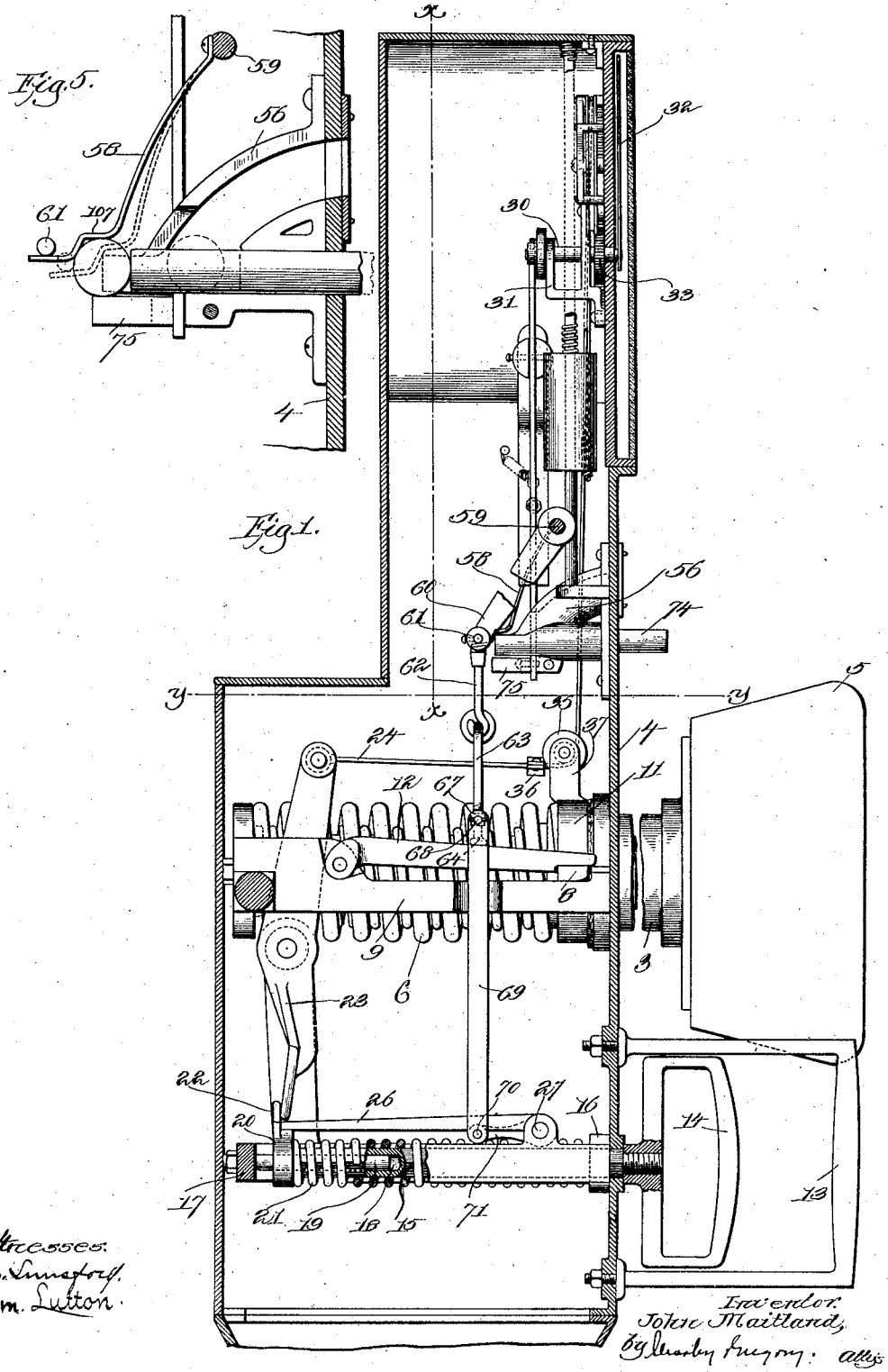

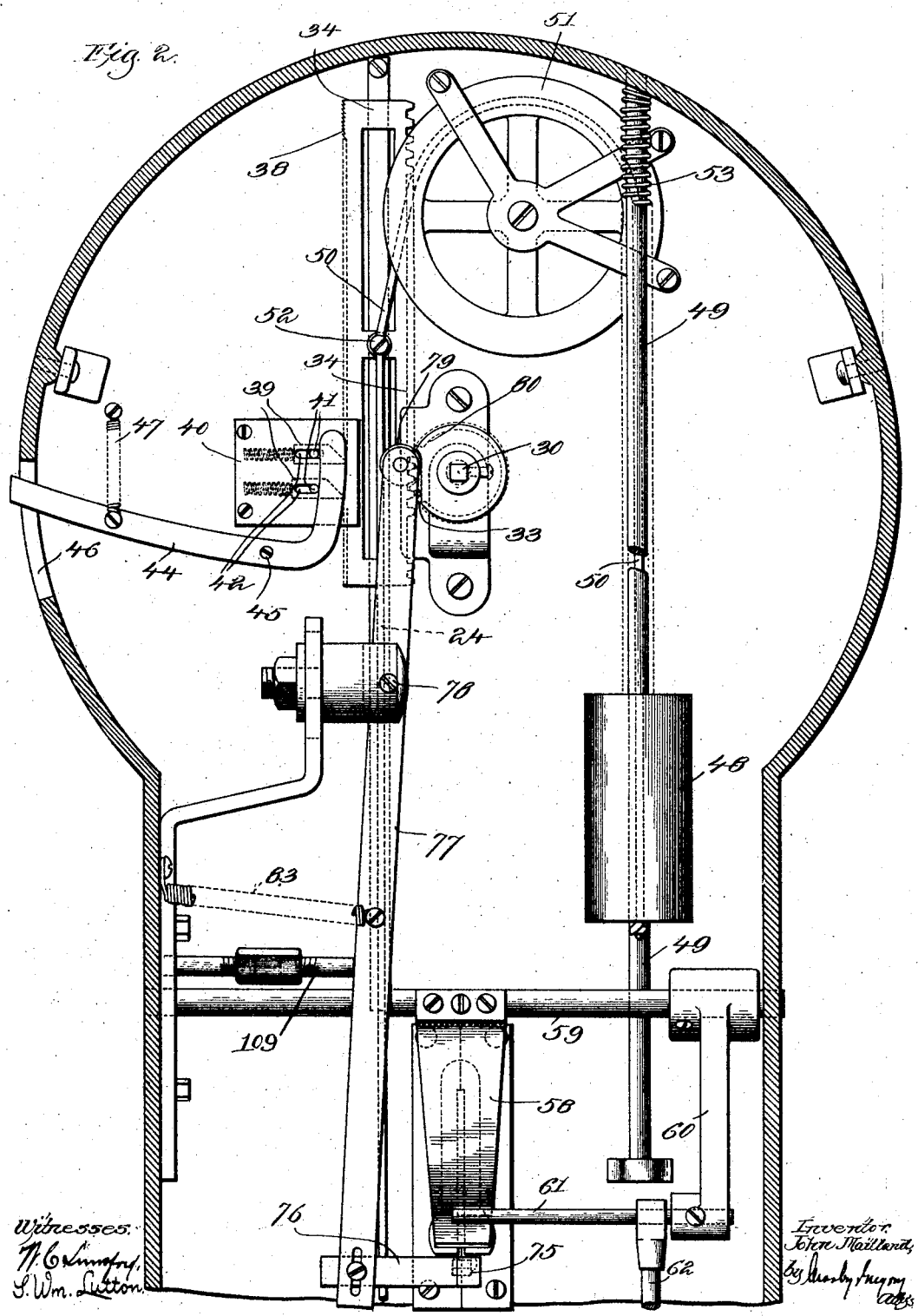

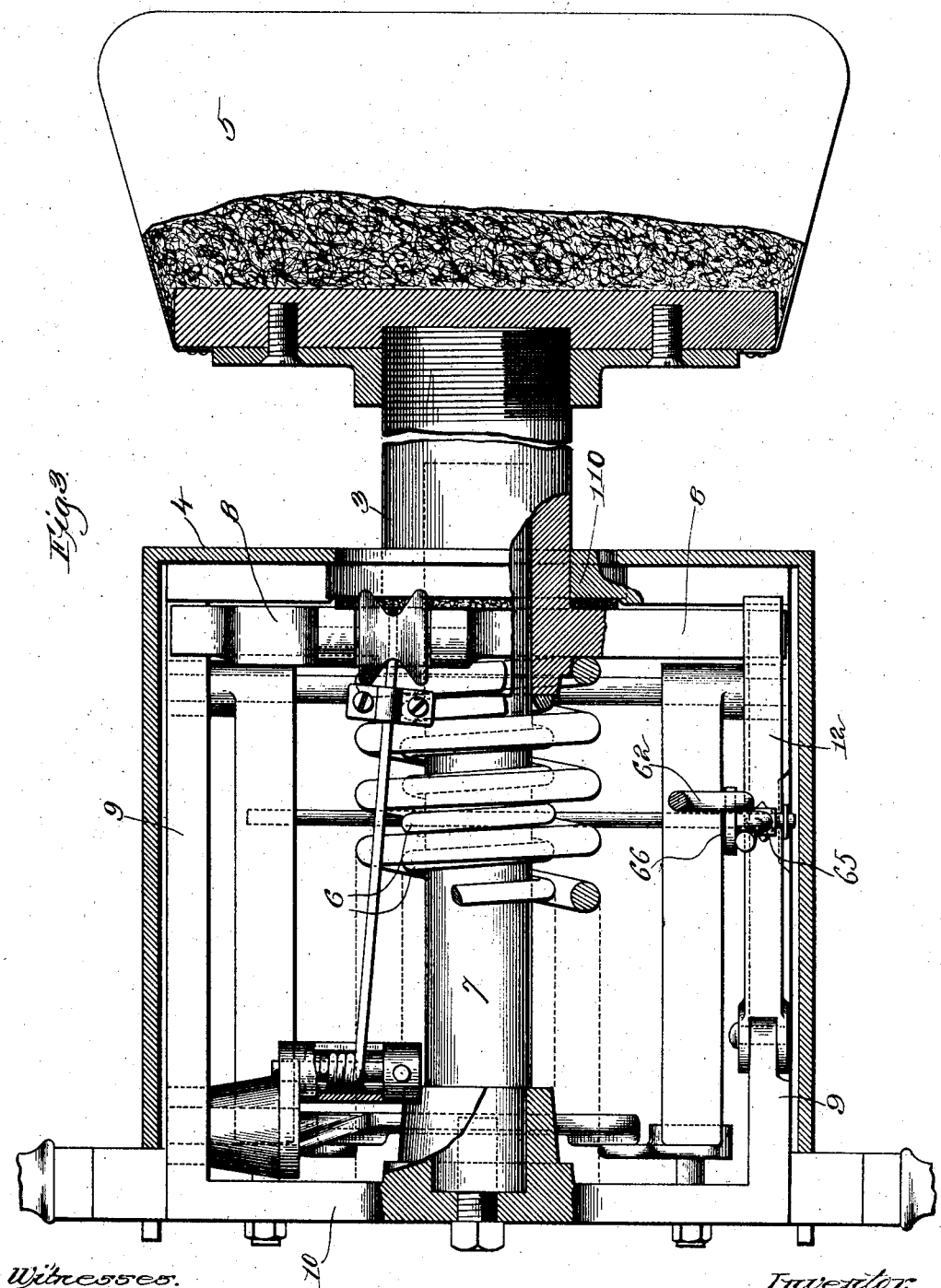

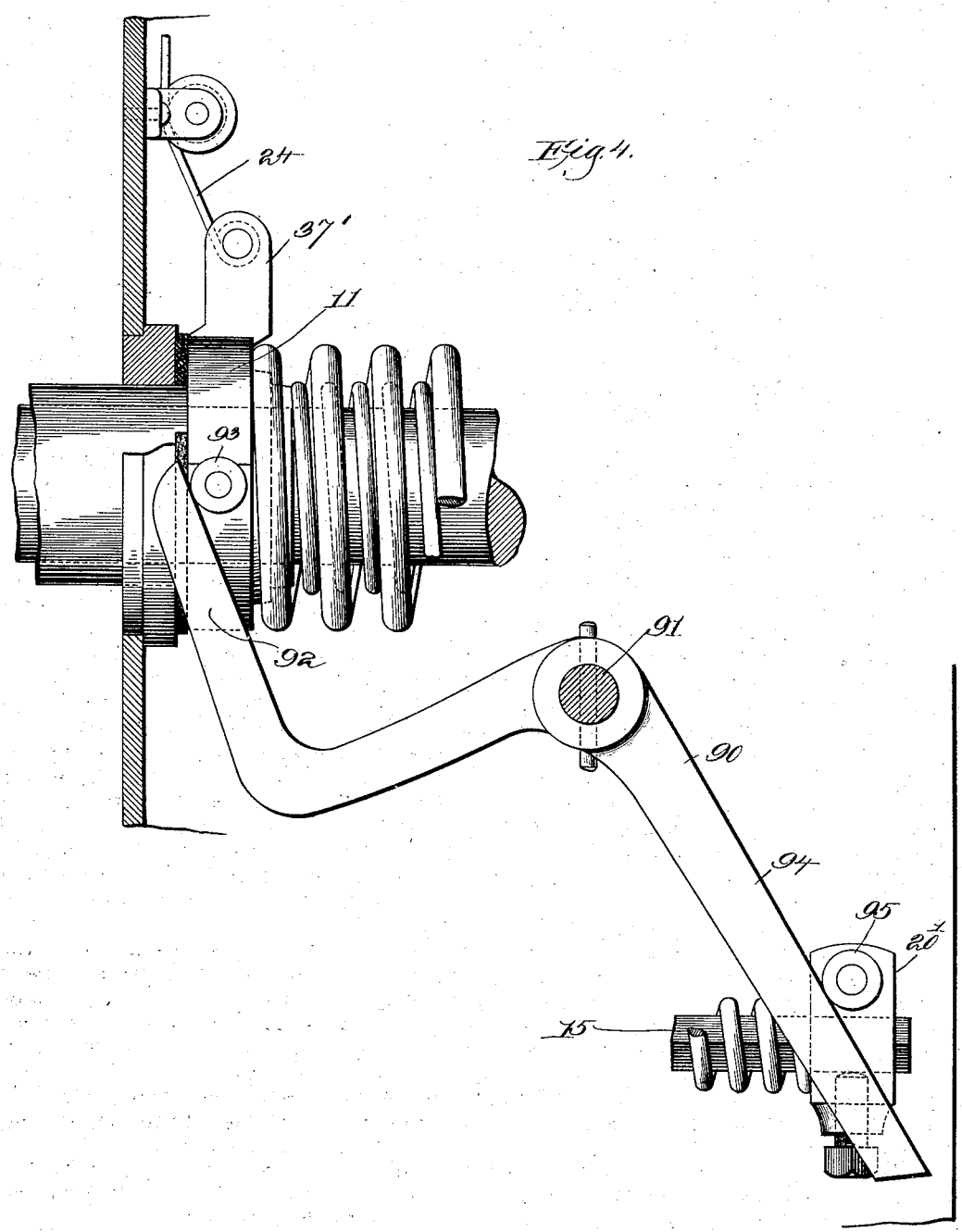

No. 768,613.  Patented August 30, 1904.

UNITED STATES PATENT OFFICE.

JOHN MAITLAND, OF SWAMPSCOTT, MASSACHUSETTS.

STRENGTH-TESTING APPARATUS.

SPECIFICATION forming part of Letters Patent No. 768,613, dated August 30, 1904.

Application filed October 9, 1903. Serial No. 176,343. (No model.)

*To all whom it may concern:*

Be it known that I, JOHN MAITLAND, a citizen of the United States, residing at Swampscott, in the county of Essex and State of Massachusetts, have invented an Improvement in Strength-Testing Apparatus, of which the following description, in connection with the accompanying drawings, is a specification, like numerals on the drawings representing like parts.

This invention relates to a strength-testing apparatus, and is an improvement upon the device illustrated in my Patent No. 723,291, granted March 24, 1903.

The improvements relate principally to the means for controlling the coin after it is deposited in the slot.

In the drawings, Figure 1 is a vertical section through a device illustrating my improvements. Fig. 2 is a section on the line $xx$, Fig. 1, looking toward the right. Fig. 3 is a section on the line $yy$, Fig. 1. Fig. 4 is a modification. Fig. 5 is a detail of the coin-controlling mechanism.

The device includes one or more testing mechanisms, a registering mechanism common to all the testing mechanisms, and novel coin-controlled locks for said testing mechanisms.

In the form of the invention herein shown the testing mechanisms include one to test the force of a blow and a grip-testing mechanism. The means for testing the force of the blow comprises a plunger 3, passing through the side of the casing 4 and carrying on its exposed end a head 5, on which the blow is struck. This plunger has at its inner end a collar or flange 11, which bears against one end of one or more springs 6, surrounding a suitable guide member 7, said springs at their other end bearing against the back side 10 of a frame inclosed within the casing. The guide member 7 is preferably supported from the back side 10 of said frame and projects into the interior of the plunger 3, which is hollowed or cored out for this purpose. Said guide member 7 therefore supports the spring 6 and also guides the plunger 3 in its inward movement. The frame which supports the guide member and against which the spring 6 rests is formed with the two side pieces 9, which are rigid with the back piece 10 and are also connected at their front ends by a cross member having a collar or bearing 110, through which the plunger 3 passes. Extending laterally from the collar or flange 11 on the plunger are arms 8, which rest and play back and forth upon the opposite sides 9 of said frame.

A locking-pawl 12, pivoted to one of the sides 9 of the frame, serves by its engagement with one of the arms 8 to lock normally the plunger against inward movement. When the pawl 12 is raised by mechanism hereinafter described, the plunger can be forced inward, and such inward movement operates the registering mechanism, which will be more fully hereinafter described. I have also illustrated a grip-testing mechanism, including a fixed handle 13, extending from the frame, and a movable handle 14, as in my patent above referred to. The movable handle 14 is mounted on a plunger 15, which is polygonal in exterior cross-section and plays through a polygonal hole in a collar 16, forming part of a suitable frame 17, which is rigidly secured in position on the interior of the casing 4. The end of the plunger 15 is provided with a bore 18, in which plays a guide member 19, carried by the frame 17.

20 designates a collar fast to the end of the plunger 15 and against which bears one end of a spring 21, which surrounds the plunger and bears at its other end against the collar 16. The collar 20 has a toe 22, which bears against one end of a pivoted lever 23, the other end of said lever being connected to a flexible connection 24, which leads to the registering mechanism hereinafter described. The outward pull on the handle 14 thus serves to rock the lever 23 and through the connection 24 register the force of the grip.

26 designates a locking-pawl which is pivoted on a rod 27, extending across the frame 17, and which serves by its engagement with the collar 20 to lock the grip-testing mechanism.

The registering mechanism comprises an arbor 30, mounted in suitable bearings 31 and carrying at its end the usual pointer 32, which plays over an exposed graduated dial. Fast on the arbor is a pinion 33, which meshes with a suitably-guided rack 34, to the lower end of which is connected one end of the flexible connection 24. Said connection passes under a guide-pulley 35, carried by the collar 11, and has thereon a stop 36, so that whenever the plunger 3 is forced inwardly the bearings 37 for the pulley 35 are brought into engagement with the stop and the rack drawn downward. The single connection 24 therefor serves as a means for connecting both of the testing mechanisms to the registering mechanism. On one side of the rack 34 are formed ratchet-teeth 38, with which coöperate one or more of spring-pressed locking-pawls 39. These pawls are carried by a suitable supporting member 40 and are guided by means of pins 41, playing in slots 42 in said member. I prefer to use a plurality of locking-pawls so arranged that the nose of one will engage a tooth of the ratchet-wheel after the nose of the other, as this prevents any appreciable lost or back motion in the rack after it has been pulled downward by one of the testing mechanisms.

44 designates a releasing-lever pivoted at 45 and having one end bent to engage the pins 41, the other end of said lever extending out through an opening 46 in the casing. A spring 47 serves to normally hold the lever out of engagement with the pins 41.

Whenever the rack is pulled down during the making of any test, the pawls 39 automatically lock said rack against backward rotation, and thus hold the pointer of the registering mechanism at the amount indicated until the releasing-lever 44 is manually operated to release the pawls and allow the rack, and consequently the pointer, to resume their normal positions. To thus automatically return the rack to its upper position, I have illustrated a weight 48, adapted to slide on suitable guides 49 and connected to the end of a flexible connection 50, which passes over a guide-pulley 51 and is connected to the rack 34, as at 52. To assist the weight in returning the rack, I prefer to use a spiral spring 53, which encircles the upper end of the guide 49 and is confined between the weight 48 and the casing 4. As the rack is drawn downward the weight is raised by means of the connection 50, such raising of the weight operating to compress the spring 53, when the pawls are released by means of the releasing-lever. Said spring, acting in conjunction with the weight, serves to quickly restore the rack to its normal position.

56 designates a coin-chute having a slot to receive the coin. This coin-chute is open at its lower end and also at one side, as best shown in Fig. 5. The lower open end of said chute is normally closed by a movable coin-arrester, and the open side is covered by a lock-releasing member 58, which is hung upon a suitable rod 59. 60 designates an arm also mounted to turn upon said rod and having a finger 61 extending at right angles thereto, which overlies the lower end of a lock-releasing member 58. Suspended from said finger is a rod or connection 62, having a hooked lower end, in the hook of which is suspended a second connection 63, which is secured to the pawl 12. The connection 63 is bent at its upper end to stand horizontally, as at 65, and is provided with a head 66 to prevent its being disengaged from the hooked member 62. The lower end of the connection 63 is screw-threaded into a boss 64 upon the pawl 12, this construction providing an adjustable connection between the member 62 and said pawl. 67 is a nut also threaded onto the stem or member 63 and having a pin 68, on which is suspended a connection 69, leading to a cross-rod 70, which lies under the pawl 26, said rod being carried by a swinging member 71, mounted on the rod 27. With this construction it will be seen that whenever the lock-releasing member 58 is swung about the rod 59 it will carry with it the arm 60 and through the connections above described raise both of the locks 12 and 26, thus releasing both of the testing mechanisms. This movement of the lock-releasing member is operated through the medium of a coin by means of a plunger 74, which extends through the casing. Whenever a coin is deposited in the slot, it falls to the lower end thereof and rests upon the coin-arrester 75, presently to be described, as shown in dotted lines, Fig. 5. As the plunger is pushed forward the coin is carried through the open side of the slot against the lock-releasing member 58, and the latter is swung about the rod 59 to raise the locks 12 and 26, above described. The testing mechanisms are now released and either one can be operated.

It is essential to provide means to hold the coin in the position in which it has been placed by the forward movement of the plunger after the plunger has been released and before the test has been commenced. For this purpose I form the lower end of the lock-releasing member 58 with the horizontal lip or nose 107, under which the coin is forced by the plunger, as seen in Fig. 5. The weight of the pawls and connected parts is sufficient to hold the coin in this position after the plunger is released and until any test has been commenced.

I have provided means whereby as soon as any test has been commenced the coin is released from the coin-chute and the locks for the testing mechanisms not in use are returned to their normal position.

The coin-arrester 75, which normally stands directly under the open end of the coin-chute, is carried by an arm 76, which in turn is adjustably secured to a lever 77, pivoted to any suitable fixed support, as at 78. This lever is mounted so that as it swings about its pivot the coin-arrester 75 is carried laterally to one side of the open end of the slot. At the upper end of the lever 77 is a roll 79, coacting with a cam 80, carried by the arbor 30. The cam and roll are so arranged with relation to each other that when the pointer is at zero the roll sets into a recess in the cam, this being the position of the parts when the coin-arrester is directly beneath the open end of the coin-chute. Normally the lever 77 is held in this position by means of an adjustable stop 109 and a suitable spring 83. As soon, however, as the arbor begins to turn, the cam 80 throws the roll to the left, Fig. 2, and thus carries the coin-arrester 75 laterally or to the right and out from beneath the open end of the coin-chute. The support for the coin is thus removed, and it drops out of the chute. As soon as it leaves the chute the weight of the locks 12 and 26 and the connecting mechanism carry the lock-releasing member into its normal position, as shown in Fig. 1, thus restoring the locks to their locking position.

From Fig. 5 it will be observed that the plunger is slightly below the lip or nose 107 of the lock-releasing member, so that in case the plunger is pushed in without the insertion of a coin the inner end of the plunger merely passes under said lip and does not actuate the lock-releasing member. This makes it absolutely necessary that a coin be inserted before the testing mechanism can be unlocked.

The means employed for releasing the coin as soon as any test has been commenced makes it impossible to make more than one test by the insertion of a single coin, for as soon as any one test has been commenced the locking-pawls for the other testing mechanisms are immediately restored to their locking position and can only be released again by the insertion of a single coin.

In Fig. 4 I have shown a slightly-modified connection between the two testing mechanisms. In said figure, 24 designates the flexible connection extending from the lugs 37' on the collar 11 of the plunger and leading to the registering mechanism. 90 designates a lever pivoted on a suitable rock-shaft 91 and having one end, 92, bent to engage a roll 93, carried by the collar 11. The other end of the lever 94 is engaged by a roll 95, carried by the head 20' on the plunger 15 of the grip or pull testing mechanism. As the plunger is pulled to the left, Fig. 4, the lever 90 is rocked and the collar 11 moved to the right, said collar, through the connection 24, registering the amount of force expended in making the test.

While I have shown only two testing mechanisms herein, it will be obvious that all of the testing mechanisms illustrated in my former patent may be employed, if desired, and any other testing mechanisms.

I do not claim, broadly, herein a strength-testing apparatus comprising a plurality of independent testing mechanisms, a locking device for each of said testing mechanisms, a releasing means common to all of said locking devices, and means whereby when any one test has been commenced the locks for the other testing mechanisms are returned to their locking position, as claims to this feature are found in my aforesaid patent. The present improvements relate to the coin-controlled feature of the device.

Various changes in the construction of the parts may be made without departing from the spirit of my invention.

Having described my invention, what I claim as new, and desire to secure by Letters Patent, is—

1. In a strength-testing apparatus, testing mechanism, registering mechanism including an arbor having a pointer thereon, connections between the testing and registering mechanisms, a lock for the testing mechanism, a lock-releasing member, a coin-chute having an open side which is normally closed by said lock-releasing member, means to force a coin into the chute against said lock-releasing member to release the lock, a movable coin-arrester to hold the coin in the chute while the lock is released, a cam on the arbor, and means actuated by said cam to operate said coin-arrester.

2. In a strength-testing apparatus, testing mechanism, registering mechanism including an arbor having a pointer thereon, connections between the testing and registering mechanisms, a lock for the testing mechanism, a lock-releasing member a coin-chute having an open side which is normally closed by the lock-releasing member and an open bottom, a movable member normally closing said bottom, means to force a coin into the chute against the lock-releasing member to release the lock, a cam on the arbor, and cam-operated mechanism for removing said movable member whereby the coin is released.

3. In a strength-testing apparatus, testing mechanism, registering mechanism including an arbor having a pointer thereon, connections between the testing and registering mechanisms, a lock for the testing mechanism, a lock-releasing member, a coin-chute having an open side which is normally closed by said lock-releasing member and an open bottom, a swinging arm carrying a coin-arrester for normally closing the bottom, means to force a coin in the slot against the lock-releasing member to release the lock, a cam on the arbor coacting with said arm whereby the coin is released as soon as the test has been commenced.

4. In a strength-testing apparatus, a plurality of testing mechanisms, a single registering mechanism for all the testing mechanisms, said registering mechanism comprising an arbor having a pointer, a lock for each testing mechanism, releasing means common to all the locks, and means to render said releasing means inoperative after a test has been commenced, said latter means including a cam on the arbor, and a swinging spring-pressed lever coöperating therewith.

5. In a strength-testing mechanism, a testing mechanism, a lock therefor, a coin-chute having an open side and bottom, a laterally-movable coin-arrester normally closing the open bottom, a lock-releasing member in line with the open side of the chute, a plunger to force a coin against the lock-releasing member whereby the lock is released, and means to move the coin-arrester laterally when the test has been commenced thereby to release the coin.

6. In a strength-testing apparatus, testing mechanism, a lock therefor, a coin-chute having an open bottom, a lock-releasing member operated by a coin in the chute, a laterally-movable coin-arrester normally closing the open bottom of the chute and supporting the coin therein while the latter acts against the lock-releasing member, and means to move the coin-arrester laterally when the test has been commenced to thereby release the coin.

7. In a strength-testing apparatus, a testing mechanism, a lock therefor, a coin-chute having an open side or bottom, a laterally-movable arrester normally closing the bottom, a lock-releasing member in line with the open side of the chute, a plunger to force a coin against said lock-releasing member to release the lock, and means to move the coin-arrester laterally when the test has been commenced thereby to release the coin from the chute, said lock-releasing member having a horizontal lip or nose under which the coin is forced by the plunger.

8. In a strength-testing apparatus, testing mechanism, a lock therefor, a coin-chute having an open side and bottom, a lock-releasing member in line with said open side, a movable coin-arrester normally closing the open bottom, a plunger to force a coin against the lock-releasing member thereby to release the lock, said coin at this time resting on the coin-arrester, and means operated by the registering mechanism to withdraw the coin-arrester immediately after a test has been commenced.

9. In a strength-testing apparatus, testing mechanism, a lock therefor, a coin-chute having an open side and bottom, a lock-releasing member in line with said open side, a coin-arrester normally closing the open bottom, a plunger to force a coin against the lock-releasing member thereby to release the lock, said lock-releasing member having a horizontal portion under which the coin is forced by the plunger, said coin at this time resting on the coin-arrester, and means to remove the coin-arrester and thereby release the coin immediately after the test has been commenced.

10. In a strength-testing apparatus, testing mechanism, a lock therefor, a coin-chute open in two places, a lock-releasing member in line with one of the openings in the coin-chute, a coin-arrester normally closing the other opening, a plunger to force the coin against the lock-releasing member thereby to release the lock, and means operated by the registering mechanism for removing the coin-arrester immediately after the test has been commenced.

11. In a strength-testing apparatus, testing mechanism, a lock therefor, a coin-chute having an open side and bottom, a lock-releasing member in line with said open side, a coin-arrester normally closing the open bottom, a plunger to force a coin against the lock-releasing member thereby to release the lock, and means operated by the registering mechanism immediately after a test has been commenced to remove the coin-arrester and thereby release the coin.

In testimony whereof I have signed my name to this specification in the presence of two subscribing witnesses.

JOHN MAITLAND.

Witnesses:
 Louis C. Smith,
 John C. Eduards.